April 3, 1951 — A. J. CORSON — 2,547,625

TEMPERATURE MEASURING APPARATUS

Filed July 16, 1946

Inventor:
Almon J. Corson,
by Prowell S. Mack
His Attorney.

Patented Apr. 3, 1951

2,547,625

UNITED STATES PATENT OFFICE 2,547,625

TEMPERATURE MEASURING APPARATUS

Almon J. Corson, Marblehead, Mass., assignor to General Electric Company, a corporation of New York Application July 16, 1946, Serial No. 684,035

1 Claim. (Cl. 73—362)

My invention relates to electrical temperature measuring apparatus of the type in which a temperature sensitive resistance influences a bridge circuit associated with an electrical measuring instrument, and its object is to provide a wide range of temperature measurement using only alternating current circuits and wherein the bridge and temperature sensitive resistance circuits are energized at low voltage through an isolating transformer embodying the measuring instrument itself. The apparatus is particularly suited for use in measuring cooking temperatures on electric ranges energized from an alternating current source, since then one may utilize the same source for temperature measurement purposes.

Figure 1:
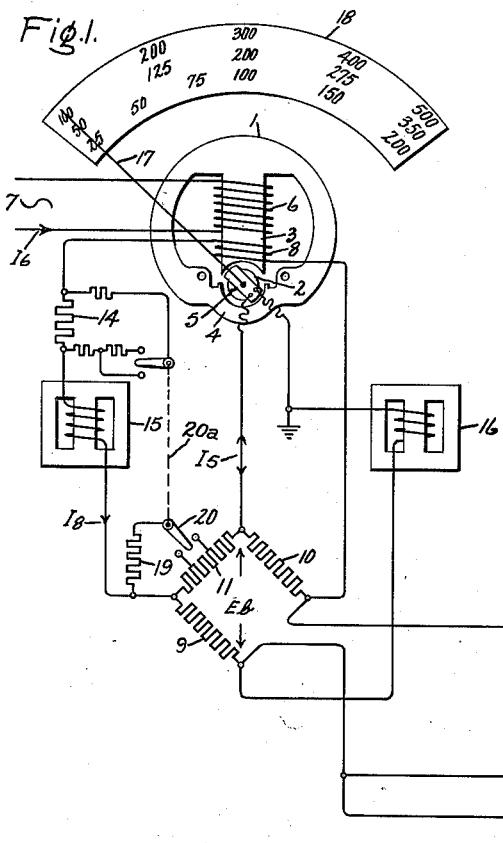
Figure 2:
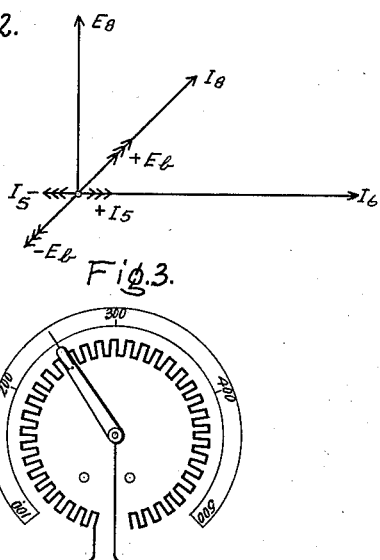
Figure 3:
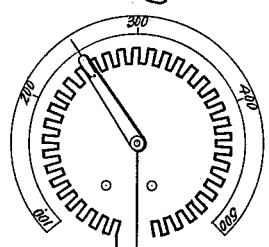
Figure 4:
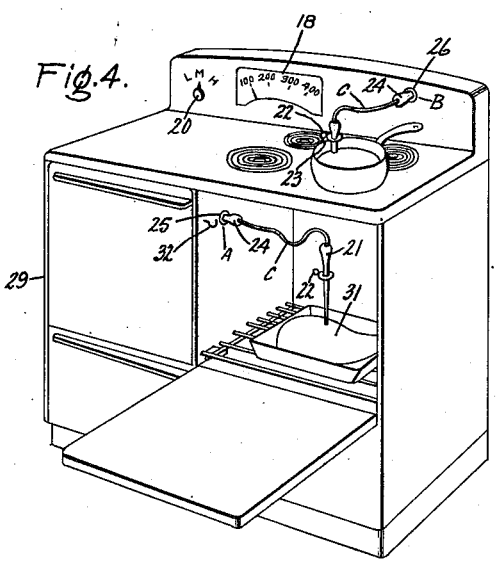
Figures 5, 6:
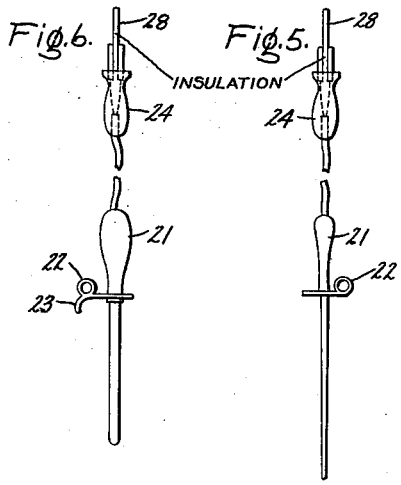

The features of my invention which are believed to be novel and patentable will be pointed out in the claim appended hereto. For a better understanding of my invention, reference is made in the following description to the accompanying drawing in which Fig. 1 represents a wiring diagram and the circuit elements used in a preferred embodiment of my invention. Fig. 2 is a vector diagram of current and voltage relations occurring in the measuring system. Fig. 3 is a scale-graduated rheostat that may be used in a null method of operating the measuring apparatus. Fig. 4 represents a cooking range equipped with my temperature measuring apparatus, and Figs. 5 and 6 show different types of temperature measuring probes and connectors therefor that may be used.

Referring now to Fig. 1, there is provided an ironclad electrical measuring instrument of the electro-dynamic type having a magnetic circuit comprising the three-legged magnetic part 1 and cylindrical core 2 which is located in an armature air gap between one end of the center leg 3 and the yoke 4 of part 1. A movable armature coil 5 is rotatively mounted in the circular air gap surrounding core 2. Supporting bridge structure for the armature pivots has been omitted in order to more clearly illustrate the magnetic circuit. The magnetic circuit described is energized by a primary coil 6 on the middle leg 3 supplied from a commercial source such as a 60-cycle, 115-volt source 7. When so energized an alternating flux passes through the middle leg, the armature gap, and core 2 and divides and finds a return path through the yoke 4 and outer legs of structure 1. Also located on the central leg 3 is a secondary coil 8 in which a voltage is induced by transformer action when coil 6 is energized. Such transformer supplies a resistance bridge circuit having resistance arms 9, 10, 11, and 12, the arm 12 being temperature sensitive, and will usually be contained in a portable probe device such as shown in Figs. 5 and 6. This bridge circuit is supplied from the secondary transformer coil 8 through a resistance 14 and an inductance 15. The ratio between primary flux and bridge excitation may be varied by the resistance 14. The armature coil 5 of the instrument is connected across the bridge through a reactance 16.

In the operation of this temperature responsive system the primary current $I_6$ flowing in coil 6 (see Fig. 2) induces a secondary voltage $E_8$ in coil 8 which causes a current $I_8$ to flow in the bridge circuit and which due to the inductance 15 is caused to lag behind the voltage $E_8$ preferably by 45 degrees. The current $I_8$ flowing in the bridge circuit causes a voltage $E_b$ to appear across the bridge when the bridge is unbalanced. The voltage $E_b$ is in phase with the bridge current but may be either plus or minus, depending on the direction of bridge unbalance and of course varies with the degree of unbalance. The voltage $E_b$ tends to cause a current $I_5$ to flow in the circuit of armature coil 5 and which, due to the reactance 16 in the armature circuit, lags behind the voltage $+E_b$ or $-E_b$ preferably by 45 degrees and is therefore substantially in phase with the current $I_6$ of primary coil 6, but like the voltage $E_b$ may be plus or minus. Thus a moving system torque is produced in the instrument. With no moving system restraint and with proper polarity, this torque will cause armature displacement of direction and magnitude to create a voltage equal and opposed to voltage $E_b$ at the bridge terminals. That is, the flux produced by $I_6$ passing through the armature induces a voltage therein, and the armature will turn in a direction to reduce the armature current and to a position where the armature torque becomes zero. In such position just enough primary flux passes through the armature to create an induced voltage $E_5$ therein to oppose the bridge voltage $E_b$ and reduce the armature torque current to zero. In the condition of instrument balance or zero torque a small current 90 degrees displaced from the primary current $I_6$ flows in the instrument armature 5 and is the exciting current of reactance 16 but produces no instrument torque.

When the bridge is balanced and $E_b$ is zero, the armature coil 5 will have a midposition with its axis at right angles to the direction of the flux produced through the armature air gap by primary coil 6 so as to be cut by no flux. When the bridge is unbalanced in one direction, the armature coil will move in a given direction from this midposition and when the bridge is unbalanced in the opposite direction, the armature coil will move in the opposite direction from midposition.

The bridge resistances are made such in relation to the temperature sensitive leg 12 thereof that when 12 is at some selected midrange value of the desired temperature measurement range, the bridge is balanced. The instrument is provided with a pointer 17 and scale 18 which is calibrated in temperature with the system. In Fig. 1 the scale includes an upper calibration from 100 to 500 degrees, with the 300-degree calibration at the midpoint of the scale. Hence, the bridge will be balanced when resistance 12 is at 300 degrees. The sensitivity of the instrument or the angular deflection of the pointer per unit temperature change is controlled by the resistor 14, while the pointer deflection at any reference temperature, as for example 300° F. on the 100–500° F. scale, is controlled by resistor 11.

Without intending to limit my invention to any particular set of values for circuit constants, coil turns, etc. but to give one example of such values which I have found satisfactory for temperature measurements over the range of 100 degrees to 500 degrees Fahrenheit, the following approximate values may be used:

Primary coil 6, 5000 turns, resistance 620 ohms, impedance 1875 ohms.
Secondary coil 8, 305 turns, reactance 6.4 ohms, D.-C., resistance 11.7 ohms.
Armature coil 5, 150 turns, A.-C. impedance 53 ohms.
Resistance 14, 5.3 ohms.
Resistance 9, 57.8 ohms.
Resistance 10, 56.8 ohms.
Resistance 11, 54.0 ohms.
Resistance 12, 55 ohms at midscale temperature of 300 degrees F. with variation of from 43 ohms at 125 deg. F. to 67 ohms at 425 deg. F.
Reactance 15, 750 turns, A.-C. impedance 119 ohms, D.-C. resistance 22.8 ohms.
Reactance 16, 404 turns, A.-C. impedance 53.5 ohms, D.-C. resistance 44.4 ohms.

The temperature sensitive resistance 12 may be made of a temperature sensitive resistance wire made in accordance with United States Patent No. 1,942,260, January 2, 1934, to Scott. All resistance elements are noninductive. The power loss in the field of the instrument is of the order of 2½ watts and in one bridge arm only about 1/100 of that in the field. Thus the power levels are kept low and the bridge small.

It is to be noted that the system requires no D.-C. source of supply and may be completely energized from a commercial A.-C. source. The system is inherently self-compensated for voltage variations of the source 7, since primary and secondary voltages will rise and fall in the same proportion. It is to be noted that the system has the advantage of relating both the bridge exciting voltage produced by secondary winding 8 and the induced armature voltage to a single field flux produced by primary winding 6. Variations in such flux for any reason will influence both of said voltages in the same relation and will not introduce errors within the limits imposed by the extraneous torques due to friction, imperfection in balance and the lead-in spirals. The secondary temperature measuring circuit and bridge operate at a low voltage of the order of seven volts maximum and are completely isolated from the primary circuit by the usual resistance between coils 6 and 8. Except for the temperature sensitive resistance 12, the bridge and its circuit elements may be housed in the instrument casing.

If desired, the temperature measurement range may be varied by changing the value of the resistance of bridge arm 11, and in Fig. 1, I have shown such resistance arm provided with taps for connecting an auxiliary resistance 19 in parallel with selected portions of arm 11 by means of a switch 20. Thus with switch 20 closed on the lower tap of resistance 11, the resistance of this arm of the bridge may be made such as to balance the bridge when the temperature of arm 12 is 200 degrees Fahrenheit, and when closed on the upper tap the resistance may be made such as to balance the bridge when the arm 12 is at 100 degrees Fahrenheit. The instrument may have multiple scales calibrated to correspond to these different temperature ranges as indicated in Fig. 1. Any corresponding necessary adjustment in sensitivity obtained at resistor 14 may be made simultaneously by mechanically interconnecting the adjusting means as represented at 20a.

If desired, the resistance arm 11 may comprise a suitable rheostat calibrated in temperature and the instrument may be operated according to the null method. Such a rheostat is represented in Fig. 3. Using this rheostat for bridge arm 11, the same would be adjusted to always produce the same instrument deflection corresponding to bridge balance and the temperature read off the rheostat scale.

The apparatus is suitable for temperature measurements generally but was designed primarily for use in connection with electric cooking ranges energized by alternating current, since a source of supply for the measuring system is always available at such ranges and the temperature measuring system may be built in as a unit with such ranges. An example of such use is illustrated in Fig. 4 representing an electric kitchen range 29 with my temperature measuring instrument built into the back panel at 30. The temperature sensitive resistance 12 of Fig. 1 may be encased in a suitable portable probe adapted to be plugged into the bridge circuit. Such probes are represented in Figs. 5 and 6, and their use indicated in Fig. 4. The probe of Fig. 5 is sharp and has a handle 21 and is thus suitable to be jabbed into the interior of a roast of meat. It has an eye 22 which can be used to hang the probe up when not in use. The probe of Fig. 6 is adapted to be inserted in a dish and has a hook part 23 for convenience in hooking over the outer edge of a dish and holding the probe upright therein. The temperature sensitive resistance elements of such probes are of course located in their lower ends as viewed in these figures. The probes have flexible leads connected to the resistance elements therein and to plug-in jacks 24 so as to be plugged into suitable sockets 25 and 26 in the range structure and into the bridge circuit of Fig. 1. The socket 25 on the back of the range preferably has a resilient switch 27 (see Fig. 1) to keep the circuit closed when a jack is removed therefrom, and the jacks may have insulated projections 28 for opening such switch when a jack is inserted in such socket.

The wiring is such, as shown in Fig. 1, that the jack of the probe used in the oven may be left in the oven socket 25 at all times without interfering with the use of a probe on the top of the range and connected through socket 26. For instance, in Fig. 1 the resistance 12 is shown connected in the bridge circuit through the oven socket 25, and as thus connected the temperature of resistor 12 will be measured. This resistor 12 is in a probe of the type shown in Fig. 5 and is shown inserted into a roast 31 in the oven in Fig. 4 and connected into oven socket 25. If now the cook desires to measure the temperature of something on the top of the range, the jack 24 of the appropriate probe is inserted into socket 26. This opens switch 27 and hence disconnects the oven probe from the bridge circuit and connects the other probe to the bridge circuit through socket 26. For measuring general oven temperatures or when the oven probe is not in use, it may be left connected but hung on a hook 32 within the oven, but out of the way. All of the probes used with a given bridge circuit will have temperature sensitive resistance elements with identical thermal resistance characteristics so as to be interchangeable without error. The scale changing switch, if used, will be accessible on the back of the range as represented at 20, Fig. 4, and will have a pointer and scale indicating which scale of the measuring instrument is to be used. In Fig. 4 the scale adjacent switch 20 has designations "H" "M" and "L" indicating high, medium, and low temperature ranges, respectively.

While the invention has been explained in connection with the measurement of temperature by means of a temperature sensitive resistance, it will be evident that it is applicable to the measurement of resistances generally, either variable or fixed, for any purpose.

What I claim as new and desire to secure by Letters Patent of the United States is:

Multiple range measuring apparatus comprising a Wheatstone bridge the arms of which comprise noninductive resistances and one of which varies in response to a variable quantity, a measuring instrument having an armature coil connected across the bridge so as to be energized when the bridge is unbalanced, a magnetic field circuit for said instrument, an alternating current primary exciting winding on said magnetic field, a secondary winding on said magnetic field connected to supply said bridge, whereby both the magnetic field and armature current of the measuring instrument are supplied through said primary coil, reactance means included in the bridge circuit connections between the secondary coil and bridge and between the bridge and armature to cause the armature current to be substantially in phase with the primary exciting current when the bridge is unbalanced in a given direction, means for adjusting the bridge for different selected measurement ranges, and means for varying the relation between the primary exciting current and the current supplied to the bridge.

ALMON J. CORSON.

REFERENCES CITED

The following references are of record in the file of this patent:

UNITED STATES PATENTS

| Number | Name | Date |
|---|---|---|
| 1,695,424 | Harrison | Dec. 18, 1928 |
| 1,979,311 | Borden | Nov. 6, 1934 |
| 2,103,513 | Campbell | Dec. 28, 1937 |

FOREIGN PATENTS

| Number | Country | Date |
|---|---|---|
| 271,921 | Great Britain | May 27, 1927 |
| 274,280 | Great Britain | July 21, 1927 |
| 401,975 | Germany | Sept. 11, 1924 |
| 470,504 | Great Britain | Aug. 16, 1937 |
| 512,735 | Great Britain | May 11, 1939 |